Feb. 15, 1944.     W. FAAS     2,341,983
INDEX DEVICE
Filed April 17, 1940     2 Sheets-Sheet 1
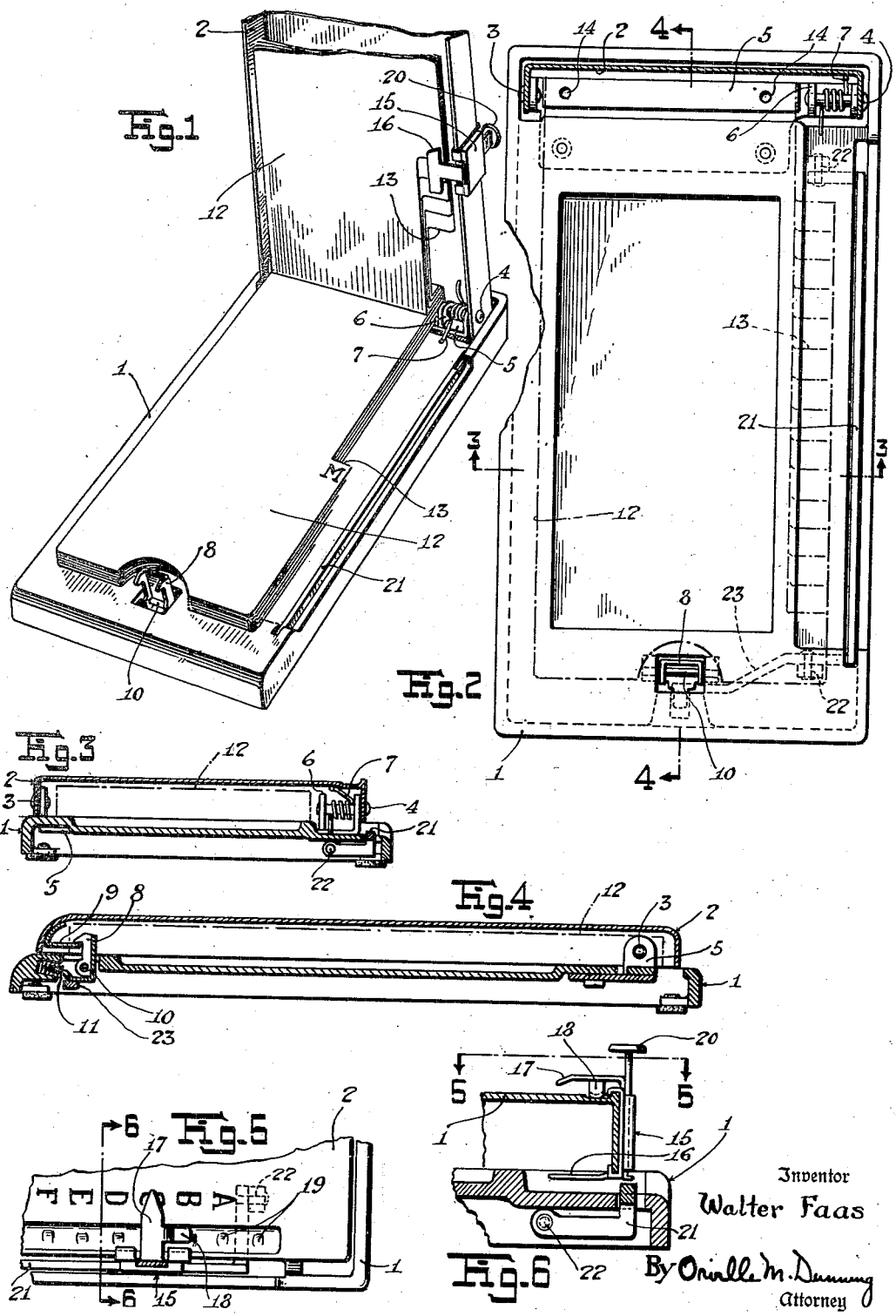
Inventor
Walter Faas
By Orville M. Dunning
Attorney Feb. 15, 1944. W. FAAS 2,341,983
INDEX DEVICE
Filed April 17, 1940 2 Sheets-Sheet 2
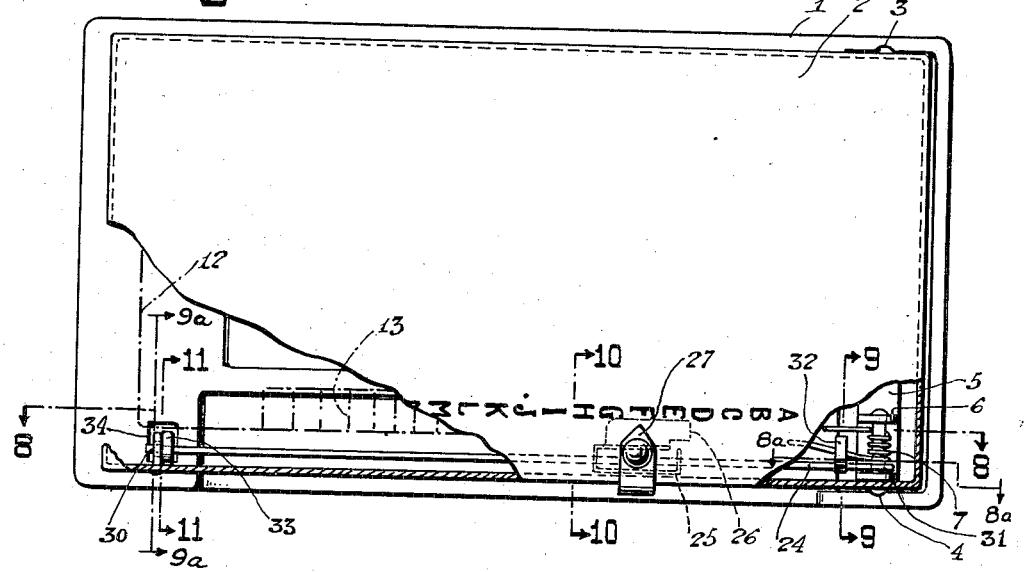
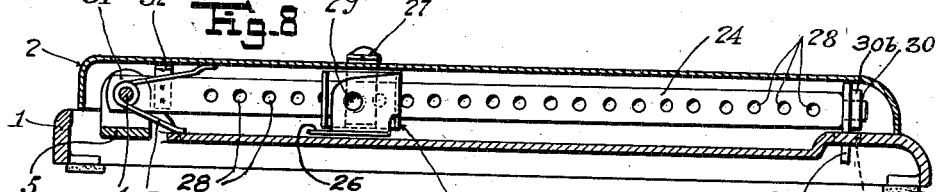
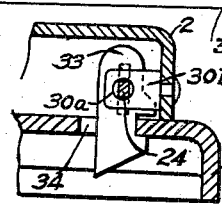
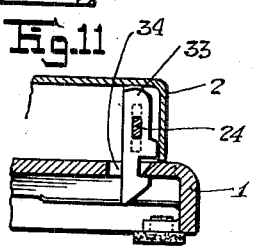
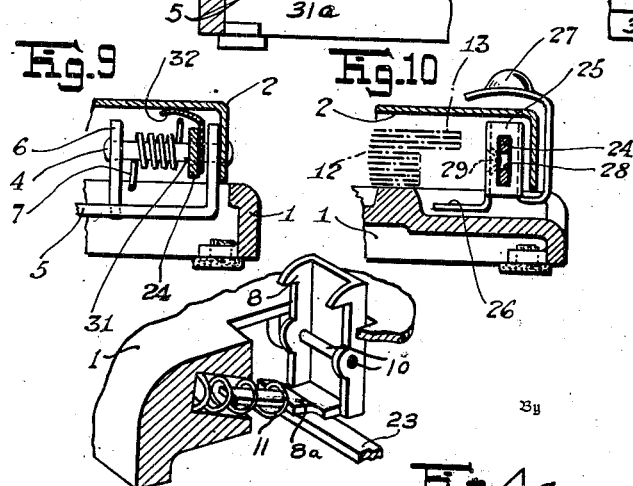
Inventor
Walter Faas
Orville M. Dunning
Attorney Patented Feb. 15, 1944

2,341,983

UNITED STATES PATENT OFFICE 2,341,983

INDEX DEVICE

Walter Faas, South Orange, N. J., assignor to The Bates Manufacturing Company, West Orange, N. J., a corporation of New Jersey Application April 17, 1940, Serial No. 330,050

7 Claims. (Cl. 40—104)

My invention relates to index devices by which ready reference may be had to a list of telephone numbers, addresses, recipes, or other classifiable matter. More particularly, it is directed to a type of index comprising a group of sheets superimposed upon each other, one or more of which is reserved for a single classification and which may readily be opened at any desired point for reference.

My invention further relates to an improvement in the general form of index as illustrated by Patent No. 2,115,537, granted to E. W. A. Peter on April 26, 1938. In the structure shown in the patent, two controls are provided for operation of the index device. By manipulation of one of these controls, any desired point of separation of the sheets composing the index may be preselected. Upon manipulation of the second device, the index is automatically opened at the point selected. In my improved device I propose to employ a single control, the manipulation of which will effect both the selection of the point of separation of the index sheets and the opening of the index to the selected point.

It is the principal object of my invention to provide in an index device of the character described, an improved construction whereby access to any desired sheet may be had more readily and quickly.

It is another object of my invention to provide such an index in which a single control member may be manipulated to perform the functions of selection and automatic opening of the device.

It is a further object of my invention to provide an index device of the character described having a control device having two modes of motion wherein movement in one of the modes effects a selection of the point at which the index will open and movement in the other of the modes effects the automatic opening of the index at the selected point.

Other objects and features of my invention will be apparent in the following specification and appended claims.

For a clearer understanding of my invention attention is directed to the drawings which accompany and form part of this specification wherein:

Figure 1 is a perspective view partly broken away of one embodiment of my improved device.

Figure 2 is a plan view of the base of the index shown in Figure 1 with a portion of the top shown in section and with the pile of index sheets indicated in dash-dot lines.

Figure 3 is an elevational view in section of the complete index as taken substantially on the line 3—3 of Figure 2, the pile of sheets of the index being shown in dash-dot lines.

Figure 4 is an elevational view in section taken substantially on the line 4—4 of Figure 2.

Figure 4a is an enlarged fragmentary sectional perspective view of the detent mechanism shown at the left hand side of Figure 4.

Figure 5 is a fragmentary plan view with the cover in closed position and is taken substantially on the line 5—5 of Figure 6.

Figure 6 is a fragmentary elevational view taken substantially on the line 6—6 of Figure 5.

Figure 7 is a plan view partly broken away of another embodiment of my invention.

Figure 8 is an elevational view taken substantially on the line 8—8 of Figure 7.

Figure 8a is a sectional view taken substantially on the line 8a—8a of Figure 7.

Figures 9, 10, and 11 are fragmentary sectional views taken respectively on the lines 9—9, 10—10, and 11—11 of Figure 7.

Figure 9a is a similar view taken on the line 9a—9a of Figure 7.

Referring first to the embodiment shown in Figures 1 through 6, the index comprises a base 1 preferably cast and a shallow box-like cover 2 hingedly secured to the base by the means of hinge pins 3 and 4 secured in a hinge bracket 5 on the base. The hinge pin 4 extends inwardly some distance from the cover and is supported at its inner end by an extra lug 6 in the hinge bracket 5 surrounding the pin 4 is a coiled spring 7 one end of which impinges on the base 1 and the other end of which presses against the cover 2. This spring is arranged to bias the cover into the open position shown in Figure 1. In order to hold the cover closed normally, a latching pawl or detent 8 is adapted to coact with a suitable latch bracket 9 in the cover. The latching pawl 8 is pivotally supported on a pin 10 carried in the base 1. A coiled spring 11 presses against a lower extension 8a of the pawl 8 and thus biases the pawl into latching position at all times. The latch pawl is so shaped that as the cover is pressed toward the base, the pawl is deflected until its nose clears the bracket when it snaps back over the bracket to hold the cover down.

Supported on the base beneath the cover is a group of superimposed sheets 12. These are secured to the base by means of a wire retainer or other suitable means (not shown) fastened in holes 14 of the hinge bracket 5. From top to bottom of the pile of sheets, each sheet is creased to form a hinge at a point successively further away from the hinge bracket so that any number of them may be lifted as a group without binding. Also from top to bottom of the pile, each successive sheet or group of sheets as desired has a successively longer cut away portion 13 on its edge.

One side of the cover 2 is suitably formed to act as a guide-rail for a slider 15 which may be readily moved along the cover. The slider 15 carries a shoe or selector 16 extending inwardly and beneath the cutaway edge portions 13 of the sheets 12. The base 1 is preferably given a depression beneath the cut away edge portion 13 so that the shoe 16 may slide freely beneath the edges of the sheets without interference. The slider 15 also carries a pointer 17 adapted to cooperate with suitable index characters on the cover as shown in Figure 6. A detent spring 18 is also carried by the slider and is adapted to coact with depressions 19 formed in the cover so that the slider is releasably retained in proper position opposite any selected index character.

It will now be seen that when the slider is moved along, the shoe will underlie the projecting edge of a portion of the sheets as determined by its position. When it is at its extreme position near the hinge end of the cover none of the edges 13 of the sheets will lie over the shoe since all are cut away sufficiently to clear the shoe in that position. As the slider is advanced, the shoe will first lie under the edge of the top sheet or group of sheets, then as it is moved further, under the edges of successively more sheets. The shoe therefore forms a means of loosely connecting all sheets above a certain selected point to the cover. The index marking on the top cover is correlated with the sheets within to indicate the point of separation. If then the cover is raised, it carries with it all sheets above the selected point, thus exposing the sheet or group of sheets indicated by the index.

The slider 15 also carries a finger piece 20 which is guided for vertical movement by suitable guideway in the slider. When the finger piece 20 is depressed it is adapted to cooperate with a bail 21 which underlies the finger piece 20 in all positions of the slider and which is pivotally mounted to the base by means of pins 22. At its forward end the bail arm is extended on the opposite side of the hinge pin to form a lever 23, the outer end of which underlies the lower extension 8a of the latching pawl 10.

It will now be seen that when the finger piece 20 is depressed, it rotates the bail in a clockwise direction and thus causes the lever 23 to press upwardly against the lower end of the latching pawl 8 thereby rotating the pawl out of its latching position against the influence of the spring 11 and permitting the cover biasing spring 7 to swing the cover open. When the cover opens, it will of course carry with it such index sheets as have been connected to it by the shoe 16.

In order to operate the index on which the cover is normally closed, the user grasps the finger piece 20 and moves the slider to the index character indicating the sheet or group of sheets to which he desires to refer and then by simply depressing the finger piece, releases the cover so that it flies open with the desired sheet of the index exposed.

Attention is now invited to the embodiment shown in Figures 7 through 11. In this embodiment the base, cover, and index sheets all have the same form and function and carry the same reference characters as in the previous embodiment. However, in the present embodiment a somewhat different form of slider 25 is carried on a guide bar 24 located within the cover. The slider carries a shoe 26 adapted to underlie the cutaway edge portions of the index sheets as in the previous embodiment and a combined finger piece and pointer 27, the pointer being adapted to cooperate with suitable index characters inscribed upon the top of the cover. The slider 25 is made in the form of a hollow square of sheet metal suitably pierced to accommodate the guide bar which has a series of holes 28 drilled in it. A suitable rounded projection 29, formed in one side wall of the slider 25, is adapted to cooperate with each of the holes 28 in the guide bar to assist in registering the pointer with the index characters and in retaining the slider in a selected position. The guide bar 24 is secured to the cover by means of a front pivotal connection 30 and a rear loose connection 31. The front pivotal connection 30 is formed by reducing the width of the guide bar and allowing it to pass through a suitable hole 30a in a bracket 30b mounted on the cover. The rear connection 31 is made by providing an over-sized hole 31a in the rear end of the guide bar through which the hinge pin 4 passes loosely. It may thus be seen that the guide bar may be oscillated about a lengthwise axis. Near the rear connection 31 a small leaf spring 32 is secured to the guide bar and impinges against the cover as shown in Figure 9 so that the spring normally tends to rotate the bar in one direction. At its opposite end the guide bar carries a latching pawl 33 which is adapted to pass through a suitable hole 34 in the base so that the biasing force applied by the spring 32 to the bar 24 will cause coaction of the nose of the pawl with the edge of the hole to latch the cover in its closed position. It will now be seen that if the cover is closed, the finger piece 27 may be pushed outwardly or rotated in a clockwise direction which will cause the latching pawl 33 to be released from the base which will in turn permit the cover biasing spring 7 to open the cover which carries with it any sheets which are connected to it by the shoe 26.

It will be observed that in both forms of the invention, the finger pieces have two modes of motion, and more particularly each finger piece is capable of moving in each of two angularly disposed directions.

To refer to the index, the user grasps the finger piece 27, moves the slider until it is opposite the character indicating the sheet to which he wishes to refer, and then pushes it outwardly, thereby releasing the latch and permitting the index to open at the selected sheet.

It will readily be seen that the embodiments of the index device shown herein may be modified in numerous ways without departing from the spirit of my invention.

Having thus described my invention I claim:

1. The combination with a support, a plurality of superimposed sheets on said support, a carrier mounted for movement relatively to said support, means for moving said carrier, and releasable holding means for preventing movement of said carrier, of a selector means movable on said carrier for selectively connecting any desired number of said sheets to said carrier, an oscillatable bar connected to said releasable holding means for actuating the latter to release said carrier, said selector means including a finger piece movable in opposite directions on said carrier to actuate said selector means, said finger piece being movable in another direction in all positions of said selector means and engageable with said oscillatable bar to oscillate the latter upon movement of the finger piece in the last-mentioned direction to actuate said holding means and release the carrier for movement.

2. A device of the character described comprising a support, a plurality of superimposed sheets mounted on said support, a carrier movable relatively to said support, a releasable detent mechanism for holding the carrier against movement, a device for actuating said detent mechanism to release said carrier, a selector movable on said carrier and selectively engageable with a sheet for moving the sheet with the carrier, a member movable on said carrier in two directions, means operatively connecting said member to said selector for movement in one of said directions for selecting a sheet, there being an operative connection between said member and said device upon movement of said member in the other direction, whereby to actuate said detent mechanism and release said carrier for movement.

3. The combination with a support, a plurality of superimposed sheets on said support, a carrier mounted for movement relatively to said support, means for moving said carrier, and releasable holding means for preventing movement of said carrier, of a selector means movable on said carrier for selectively connecting any desired number of said sheets to said carrier, and means connected to said releasable holding means for actuating the latter to release said carrier, a finger piece movable in opposite directions on said carrier, means operatively connecting said finger piece to said selector means to actuate the latter, said finger piece also being movable in another direction in all of the positions of said selector means and means operatively connecting said finger piece to said means for actuating said holding means to operate the latter upon movement of the finger piece in the last-mentioned direction for releasing said carrier for movement.

4. In a device comprising a support, a plurality of superimposed relatively separable sheets mounted on said support, a movable carrier mounted on and movable relatively to said support and connectible with a group of said sheets, biasing means urging said carrier into a position wherein any sheets connected to it are separated from the rest of said sheets, and a latch for holding said carrier against the urging of said biasing means: the combination of selector means movable on said carrier to selectively connect a desired number of said sheets to said carrier, said means including a finger piece movable with and relatively to said selector means, a bar on said support connected to said latch to release it upon actuation of said bar, said finger piece being arranged relatively to said bar to abut and actuate the latter upon movement of the finger piece relatively to said selector means in any position of the selector means.

5. A device of the character described comprising a support, a plurality of superimposed sheets mounted on said support for swinging movement, a cover pivotally connected to said support and spring biased away therefrom, means for selectively connecting to said cover for movement therewith any desired number of said sheets, said means including a device mounted on said cover for movement longitudinally along one edge thereof and a member that is also movable in another direction transversely of said direction of said longitudinal movement, and means for releasably holding said cover in a position adjacent said support and including an element which is related to said cover and said member so as to be directly engaged with and actuated by said member upon movement of the latter in the second-mentioned direction when said member is at any point in its movement longitudinally of said edge.

6. A device of the character described comprising a support, a plurality of superimposed sheets mounted on said support for swinging movement, a cover pivotally connected to said support and spring biased away therefrom, means for selectively connecting to said cover for movement therewith any desired number of said sheets, said means including a device mounted on said cover for movement longitudinally along one edge thereof and a member that is also movable toward and from said support when the cover is in a position adjacent the support, and means for releasably holding said cover in said position including a bar oscillatably mounted on said support in position to be abutted and actuated by said member upon movement of the latter toward said support when said member is in any position in its movement along said edge of the cover and said cover is in said position adjacent said support.

7. A device of the character described comprising a support, a plurality of superimposed sheets mounted on said support for swinging movement, a cover pivotally connected to said support and spring biased away therefrom, means for releasably holding said cover in a position adjacent said support including a bar mounted on said cover along one edge and oscillatable to release said cover, means for selectively connecting to said cover for movement therewith any number of said sheets, said means including a member mounted on said bar for sliding movement longitudinally thereof and to oscillate therewith, there being a finger piece on said member for moving it longitudinally of said bar and for oscillating the bar to release said cover.

WALTER FAAS.